United States Patent
Hu et al.

(10) Patent No.: US 9,689,292 B2
(45) Date of Patent: Jun. 27, 2017

(54) DEVICE AND METHOD FOR CONTROLLING UREA INJECTION SYSTEM OF DIESEL ENGINE

(75) Inventors: Guangdi Hu, Shandong (CN); Shaojun Sun, Shandong (CN); Dehui Tong, Shandong (CN); Shenggang Guo, Shandong (CN); Yongliang Sun, Shandong (CN)

(73) Assignee: Weichai Power Co., Ltd., Weifang (CN)

( * ) Notice: Subject to any disclaimer, the term of this patent is extended or adjusted under 35 U.S.C. 154(b) by 53 days.

(21) Appl. No.: 14/112,918

(22) PCT Filed: Apr. 19, 2011

(86) PCT No.: PCT/CN2011/073004
§ 371 (c)(1),
(2), (4) Date: Oct. 18, 2013

(87) PCT Pub. No.: WO2012/142745
PCT Pub. Date: Oct. 26, 2012

(65) Prior Publication Data
US 2014/0047820 A1 Feb. 20, 2014

(51) Int. Cl.
*F01N 3/00* (2006.01)
*F01N 3/10* (2006.01)
(Continued)

(52) U.S. Cl.
CPC .............. *F01N 3/10* (2013.01); *F01N 3/208* (2013.01); *F01N 9/00* (2013.01); *F01N 2610/02* (2013.01);
(Continued)

(58) Field of Classification Search
CPC ... F01N 3/10; F01N 3/208; F01N 9/00; F01N 2610/146; F01N 2610/02;
(Continued)

(56) References Cited

U.S. PATENT DOCUMENTS 7,971,426 B2 *  7/2011  Van Nieuwstadt ............. 60/277
2009/0199538 A1 *  8/2009  Boe et al. ........................ 60/274
(Continued)

FOREIGN PATENT DOCUMENTS

CN       101798946 A      8/2010
CN       101963084 A      2/2011
(Continued)

OTHER PUBLICATIONS

PCT International Search Report, PCT Application No. PCT/CN2011/073004, Feb. 9, 2012, 5 pages.
(Continued)

*Primary Examiner* — Phutthiwat Wongwian
*Assistant Examiner* — Kelsey Stanek
(74) *Attorney, Agent, or Firm* — Fenwick & West LLP

(57) ABSTRACT

Disclosed are an apparatus and a method for controlling a urea injection system of a diesel engine. The apparatus (200) comprises: an operation condition parameter acquiring module (201), a control quantity determining module (202) and a drive signal determining module (203), wherein the operation condition parameter acquiring module (201) is configured to acquire operation condition parameters related to the urea injection system, the control quantity determining module (202) is configured to determine a control quantity for controlling the urea injection system based on the operation condition parameters, a target value of urea pressure in a urea buffer chamber (107) and a control model designed based on a physical model of the urea injection system, and the drive signal determining module (203) is configured to determine a drive signal for a urea pump (103) drive motor (106) according to the determined control quantity. The method for controlling the urea injection system may achieve accurate control of the urea injection (Continued)

pressure, and reduce a deviation between the urea pressure and a target value of the urea pressure.

16 Claims, 4 Drawing Sheets

(51) Int. Cl.
    *F01N 3/20*         (2006.01)
    *F01N 9/00*         (2006.01)

(52) U.S. Cl.
    CPC    *F01N 2610/146* (2013.01); *F01N 2900/1808* (2013.01); *F01N 2900/1812* (2013.01); *Y02T 10/24* (2013.01); *Y02T 10/47* (2013.01)

(58) Field of Classification Search
    CPC ..... F01N 2900/1808; F01N 2900/1812; Y02T 10/47; Y02T 10/24
    USPC .................................................. 60/272–324
    See application file for complete search history.

(56) References Cited

U.S. PATENT DOCUMENTS

| | | |
|---|---|---|
| 2011/0047972 A1 | 3/2011 | Bauer et al. |
| 2012/0067031 A1* | 3/2012 | Wang et al. ............... 60/277 |
| 2013/0055701 A1* | 3/2013 | Yan et al. ............... 60/287 |

FOREIGN PATENT DOCUMENTS

| | | |
|---|---|---|
| CN | 101994551 A | 3/2011 |
| WO | WO 02/25074 A1 | 3/2002 |

OTHER PUBLICATIONS

PCT Written Opinion, PCT Application No. PCT/CN2011/073004, Feb. 9, 2012, 4 pages.
PCT International Preliminary Report on Patentability, PCT Application No. PCT/CN2011/073004, Oct. 22, 2013, 5 pages.

* cited by examiner

DEVICE AND METHOD FOR CONTROLLING UREA INJECTION SYSTEM OF DIESEL ENGINE

FIELD OF THE INVENTION

The present invention generally relates to the technical field of diesel engines, and more specifically, relates to an apparatus and method for controlling a urea injection system of a diesel engine.

BACKGROUND OF THE INVENTION

Since diesel engines come into being, they have been widely applied in various propulsion installation, ships and vehicles due to their advantages such as excellent dynamic performance, cost-effectiveness and durability. Compared with gasoline engines, diesel engines have many advantages: reduced exhaust gas emission, better acceleration performance at a lower vehicle speed, lower average fuel consumption, and more driving fun. However, as compared with the gasoline engine with the same power, the diesel engine emits particulates and oxynitride which are two most major pollutants in the exhaust gas.

At present, a technology for reducing vehicle exhaust gas emission to meet an emission standard usually employs an exhaust gas post-treatment manner to reduce the emission of pollutants. Amongst others, urea selective catalytic reduction (SCR) method is a method which is of the most practical significance and it may effectively reduce oxynitride in the exhaust gas of the engine.

In a SCR urea metering injection system of an existing diesel engine (hereinafter referred to as a urea injection system), a PID type control policy is employed for controlling urea pressure, which requires massive calibration work. Besides, based on the existing PID control policy and in some operation conditions of an engine, there would a large deviation between an actual value and the target value of the urea pressure, which causes a relatively larger deviation between an actual injection amount of urea and a target urea injection amount in the urea injection system, which therefore directly affects conversion rate of oxynitride in the engine post-treatment SCR system.

Based on the above reasons, it is of crucial importance to develop advanced urea pressure control policy of the urea injection system to improve the engine performance and reduce the calibration work. To this end, there is a need in the art to improve the control technology for the urea injection system.

SUMMARY OF THE INVENTION

In view of the above, the present invention discloses an apparatus and method for controlling a urea injection system of a diesel engine, to overcome or at least partially eliminate at least some drawbacks existing in the prior art.

According to one aspect of the present invention, there is provided an apparatus for controlling a urea injection system of a diesel engine. The apparatus may comprise: an operation condition parameter acquiring module configured to acquire operation condition parameters related to the urea injection system; a control quantity determining module coupled to the operation condition parameter acquiring module and configured to determine a control quantity for controlling the urea injection system based on the operation condition parameters, a target value of a urea pressure in a urea buffer chamber and a control model designed based on a physical model characterizing the urea injection system, wherein the control quantity is a rotation speed of a urea pump drive motor; and a drive signal determining module coupled to the control quantity determining module and configured to determine a drive signal for driving the urea pump drive motor according to the determined control quantity.

In one preferred embodiment according to the present invention, the apparatus may further comprise: an observation value determining module coupled to the operation condition parameter acquiring module and the control quantity determining module and configured to determine, based on the operation condition parameters as well as an observer model designed based on the physical model, an observation value of the urea pressure in the urea pump chamber, for using by the control quantity determining module in determining the control quantity.

In a further preferred embodiment according to the present invention, the observer model is designed by adding an adjustment item respectively to an expression for the urea pressure in the urea pump chamber and an expression for the urea pressure in the urea buffer chamber in the physical model, and by selecting adjusting factors to make both adjusted expressions stable and converged.

In a further preferred embodiment according to the present invention, the observation value determining module may be further configured to determine an observation value of the urea pressure in the urea buffer chamber based on the operation condition parameters as well as the observer model, for using by the control quantity determining module in determining the control quantity.

In another preferred embodiment according to the present invention, operation condition parameters may comprise: a urea pump plunger stroke, a urea pressure in the urea pump chamber, a urea pressure in the urea buffer chamber, a urea pump urea inflow, a urea pump urea outflow, a urea injector urea injection flow, and a urea buffer chamber urea backflow.

In a further preferred embodiment according to the present invention, the physical model may be characterized by: an expression for urea pump urea inflow; a an expression for urea pump urea outflow; an expression for the urea pressure in the urea pump chamber; an expression for the urea pressure in the urea buffer chamber; an expression for the urea buffer chamber urea backflow; and an expression for the urea injector urea injection flow.

In a further preferred embodiment according to the present invention, the control model may comprise a feedforward controller and wherein the control quantity may comprise a feedforward control component.

In another preferred embodiment of the present invention, the feedforward control component $\omega_{FF}$ may be expressed as:

$$\omega_{FF} = -\frac{\sqrt{2}}{r\gamma_4}[\gamma_1 Q_{in} - \gamma_2 Q_r + \gamma_3(Q_{inj} + Q_s)]$$

wherein $\gamma_1$, $\gamma_2$, $\gamma_3$ and $\gamma_4$ are control coefficients and determined based on the acquired operation condition parameters and constant parameters related to the physical model; r is a crank radius of a connecting mechanism between the drive motor and the urea pump plunger; $Q_{in}$ is the urea pump urea inflow; $Q_r$ is urea pump urea outflow; $Q_{inj}$ is urea injector urea injection flow; and $Q_s$ is urea buffer chamber urea backflow.

In a further preferred embodiment according to the present invention, the control model comprises a feedback controller, and wherein the control quantity may comprise a feedback control component.

In another preferred embodiment according to the present invention, the feedback control component $\omega_{FB}$ may be expressed as:

$$\omega_{BF} = \frac{\sqrt{2}}{r\gamma_4}\left(k_p e + k_i \int e + k_d \dot{e}\right)$$

wherein e is an error between an actual value of the urea pressure in the urea buffer chamber and its target value; $\gamma_4$ is a control coefficient and determined based on the acquired operation condition parameters and constant parameters related to the physical model; r is a crank radius of a connecting mechanism between the drive motor and the urea pump plunger; $k_p$, $k_i$, and $k_d$ are control coefficients respectively for proportional control, integral control and derivative control, and $k_p$, $k_i$, and $k_d$ are selected to make the urea injection system stable.

According to another aspect of the present invention, there is provided a method for controlling the urea injection system of the diesel engine. The method may comprise: acquiring operation condition parameters related to the urea injection system; determining a control quantity for controlling the urea injection system based on the operation condition parameters, a target value of a urea pressure in a urea buffer chamber and a control model designed based on a physical model characterizing the urea injection system, wherein the control quantity is a rotation speed of a urea pump drive motor; and determining a drive signal for driving the urea pump drive motor based on the determined control quantity.

According to embodiments, particularly preferred embodiments of the present invention, control of the urea injection system is performed based on the physical model characterizing the urea injection system of the diesel engine. Since the physical model of the urea injection system of the diesel engine is adapted for an operation procedure of the system under any operation conditions, the physical model-based technical solution of the present invention may achieve an accurate urea injection pressure and a fast system response, which may in turn reduce a deviation between an actual value of the urea pressure and a target pressure and minimize it in the preferred embodiments. Besides, the control model designed based on the physical model of the urea injection system may be quantified, and thereby substantially reduces the calibrated workload for the control model, and improves efficiency and functionality of the urea injection system of the engine.

BRIEF DESCRIPTION OF THE DRAWINGS

The above and other features of the present invention will become more apparent through detailed description of the embodiments as illustrated with reference to the accompanying drawings, in which like reference signs indicate like or similar components. In the accompanying drawings, FIG. 1 schematically illustrates a structure of a urea injection system of a diesel engine.

DETAILED DESCRIPTION OF EMBODIMENTS

Hereinafter, an apparatus and method for controlling a urea injection system of a diesel engine as provided by the present invention will be depicted in detail through embodiments with reference to the accompanying drawings. It should be understood that these embodiments are provided only to enable those skilled in the art to better understand and further implement the present invention, not intended for limiting the scope of the present invention in any manner.

Additionally, the term "operation condition parameter" used herein indicates any value that can indicate a physical quantity of the (target or actual) physical state or operation condition of the engine. Moreover, in the context of this specification, term "parameter(s)" may be used interchangeably with the physical quantity represented thereby. For example, "a parameter indicating urea flow" has an equivalent meaning herein with "urea flow." Moreover, in the context of the present specification, suppose P denotes a certain physical quantity, then $\dot{P}$ denotes a derivative of P with respect to time, i.e, P's change ratio with time; $\hat{P}$ denotes an observed value of the physical quantity P.

Besides, the term "acquire" and its derivatives used herein include various means currently known or to be developed in future, for example, collecting, measuring, reading, estimating, predicting, observing, etc.; the term "measure" and its derivatives used here include various means currently known or to be developed in the future, such as means of directly measuring, reading, computing, estimating, etc.

Figure 1:
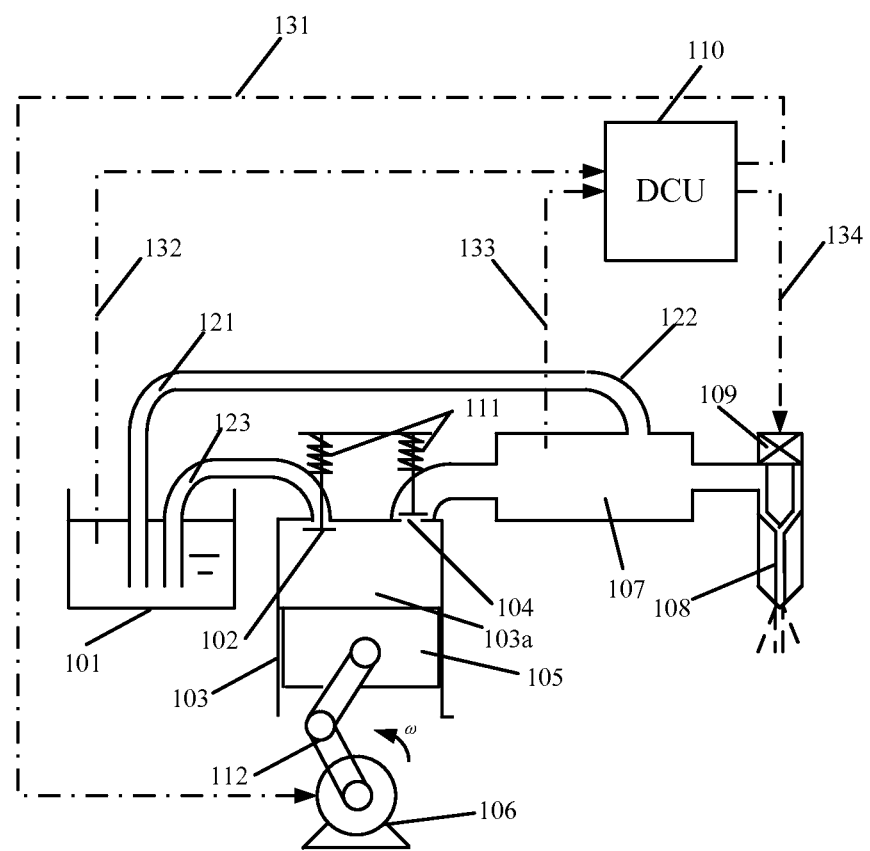

Next, reference is first made to FIG. 1 to describe the structure schematic view of the urea injection system of the diesel engine. It should be appreciated that FIG. 1 only illustrates a portion of the urea injection system of the diesel engine related to the present invention, and in fact the urea injection system may further comprise any number of other parts.

As shown in FIG. 1, the urea injection system comprises: a urea tank 101, a urea pump inlet valve 102, a urea pump 103, a urea pump outlet valve 104, a drive motor 106, a urea buffer chamber 107, a urea injector 108, a urea injector drive electromagnetic valve 109 and a urea control unit (DCU) 110.

In the urea tank 101 is received urea solution which is under an atmospheric pressure. The urea tank 101 is communicated with a pump chamber of the urea pump 103 through an inflow tube 123. Furthermore, the urea pump inlet valve 102 is disposed at an inlet interfacing with a urea pump. When a pressure in the chamber of the urea pump 103 is lower than the atmospheric pressure, the atmospheric pressure will enable the inlet valve to open against a pretightening force provided by an inlet valve spring 111 so that the urea solution is sucked into the chamber of the urea pump. When the pressure in the chamber of the urea pump is higher than the atmospheric pressure, the inlet valve will be closed. Therefore, a one-way path from the urea tank 101 to the urea pump 103 is provided for the urea via the inlet valve 102.

The urea pump 103 comprises a urea pump plunger 105 which is driven by the drive motor 106 via a urea pump mechanism crank arm 112 (namely, a connecting mechanism between the urea pump plunger 105 and the drive motor 106). When the drive motor 106 drives the urea pump plunger 105 downwardly in response to a drive signal 131 from the urea control unit 110, a vacuum will be formed in the urea pump chamber 103a to cause the pressure in the urea pump chamber 103a lower than the atmospheric pressure, whereby the inlet valve 102 is opened to suck the urea solution into the urea pump chamber 103a. On the other hand, when the drive motor 106 drives the urea pump plunger 105 to move upwardly in response to the drive signal 131 from the urea control unit 110, high-pressure urea solution will be formed in the urea pump chamber 103a. At this time, the pressure in the urea pump chamber 103a is far greater than the atmospheric pressure and therefore the inlet valve 102 is closed. Meanwhile, when the pressure in the urea pump chamber 103a is greater than the pressure in the urea buffer chamber 107, the urea pump outlet valve 104 is opened so that the urea solution enters the urea buffer chamber 107. When the urea pump plunger 105 moves downwardly, the pressure in the urea pump chamber 103a is to be smaller than the pressure in the urea buffer chamber 107, so the urea pump outlet valve 104 is closed. Therefore, similar to the urea pump inlet valve 102, the urea pump outlet valve 104 provides the urea with a one-way path from the urea pump 103 to the urea buffer chamber 107.

The urea buffer chamber 107 is used to store high-pressure urea solution. Generally, the pressure of the high-pressure urea solution should be maintained at 9 atmospheric pressures. However, it is noticeable that the pressure may be slightly different for different urea injection systems.

The urea buffer chamber may be communicated with the urea injector 108. The urea injector 108 is a key member of the urea injection system. The injector drive electromagnetic valve 109, driven by the drive signal 134 provided from the urea control unit 110, opens or closes the electromagnetic valve so that the urea solution is injected out through the urea injector 108 and enters a SCR pipe.

In addition, in the urea tank is mounted a measuring element (e.g., a temperature sensor or a liquid level sensor) to provide the urea control unit 110 with measured urea tank temperature and liquid level signal 132. Besides, in the urea buffer chamber is also mounted a measuring element (e.g., a pressure sensor) to provide the urea control unit 110 with the measured signal 133 of the pressure in the urea buffer chamber.

Based on these operation conditions and a predetermined control policy of the urea system, the urea control unit 110 provides a drive signal for the urea pump drive motor 106 and the urea injector drive electromagnetic valve 109 to achieve a target urea injection pressure.

Additionally, in the system shown in FIG. 1, to avoid crystallization of urea solution, the urea solution in the urea buffer chamber 170 flows through a backflow pipe 121 back to the urea tank 101 so that a circulation is formed between the urea tank 101 and the urea buffer chamber 107.

As can be seen from FIG. 1 and the description about the urea injection system, the urea injection system 100 comprises a number of parts and has very complicated operation conditions, so it is very difficult to precisely control the urea pressure in the urea buffer chamber 107 by controlling the urea pump drive motor 106.

Therefore, in order to address this technical problem, the inventors of the present invention design a technical solution of controlling the urea injection system to achieve a desired urea pressure. The inventors apply physical model knowledge of the urea injection system to system control, and achieves effective control which may not be achieved by the prior art based on use of model knowledge about parameters related to the urea pump, urea buffer chamber and the urea injector. Hereinafter, the technical solution provided by the present invention will be described in detail with reference to specific embodiments so that those skilled in the art can easily understand and implement the present invention according to the disclosure herein.

Figure 2:
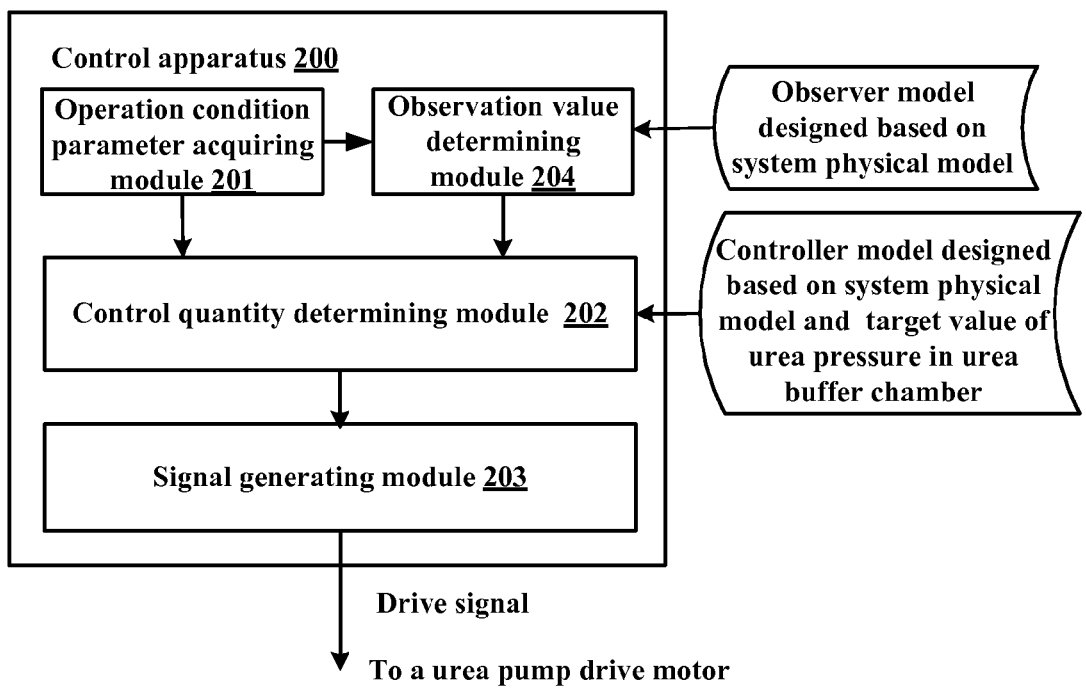
FIG. 2 schematically illustrates a block diagram of an apparatus for controlling a urea injection system of a diesel engine according to an embodiment of the present invention.

First, reference is made to FIG. 2 to describe the apparatus for controlling a urea injection system of a diesel engine according to the present invention. FIG. 2 schematically illustrates an exemplary block diagram of an apparatus for controlling the urea injection system according to an embodiment of the present invention. Those skilled in the art may appreciate that an apparatus 200 may be specifically implemented as for example an electrical control unit 118 as shown in FIG. 1. However, the present invention is not limited to this, and it may be implemented as an individual control apparatus.

As shown in FIG. 2, the control apparatus 200 may comprise an operation condition parameter acquiring module 201, a control quantity determining module 202 and a signal generating module 203, and preferably further comprise an observation value determining module 204. The operation condition parameter acquiring module 201 is coupled to the control quantity determining module 202 and configured to acquire operation condition parameters related to the urea injection system and provide them to the control quantity determining module 202. The control quantity determining module 202 is coupled to the signal generating module 203 and configured to determine a control quantity based on the operation condition parameters from the operation condition parameter acquiring module 201, a target value of urea pressure in the urea buffer chamber and a control model based on a physical model of the urea injection system.

In the following text, an exemplary embodiment is first described in conjunction with an example to illustrate the building of the physical model of the urea injection system. However, noticeably in the embodiments according to the present invention, any appropriate manner may be employed to build the physical model characterizing the urea injection system, not merely limited to the exemplary embodiment presented herein.

In this exemplary embodiment, the physical model of the urea injection system may be characterized by: an expression for a urea pump urea inflow; an expression for a urea pump urea outflow; an expression for urea pressure in the urea pump chamber; an expression for urea pressure in the urea buffer chamber; an expression for the urea injector urea injection flow; and an expression for the urea buffer chamber urea backflow. These equations will be described in detail. However, it should be noted that this is only for an exemplary purpose and the present invention is not limited thereto.

Physical Model of the Urea Injection System

First, in order to consider physical relations between main mechanical, hydraulic and control components of the urea injection system while designing a model-based urea pressure control model by using the given physical model, assumptions are made as follows:

Leakage of the urea injection system is neglected;
Influence of a temperature change on urea density is neglected;
It is assumed that a urea flow coefficient not vary with temperature and pressure.

On the above assumption, the following relation expressions may be obtained.

1. Urea Pump Urea Inflow Expression

Regarding the urea pump, for example a urea inflow expression may be obtained as follows:

$$Q_{in} = C_{in} A_{in} \sqrt{\frac{2(P_{in} - P_p)}{\rho}} \quad \text{(Equation 1)}$$

wherein:
$Q_{in}$: a urea pump urea inflow
$C_{in}$: a flow coefficient (constant) of the urea pump inlet valve
$A_{in}$: an equivalent cross-sectional area of the urea pump inlet valve upon opening
$\rho$: a urea density (constant);
$P_{in}$: a urea tank urea pressure which is an atmospheric pressure, namely, $P_{in}=P_0$ (atmospheric pressure)
$P_p$: a urea pressure in the urea pump chamber 2. Urea Pump Urea Outflow Expression For the urea pump, for example a urea outflow equation may be obtained as follows:

$$Q_r = C_r A_r \sqrt{\frac{2(P_p - P_r)}{\rho}} \quad \text{(Equation 2)}$$

wherein:
$Q_r$: a urea pump urea outflow
$C_r$: a flow coefficient (constant) of a urea pump outlet valve
$A_r$: an equivalent cross-sectional area of the urea pump outlet valve upon opening
$\rho$: a urea density (constant)
$P_r$: a urea pressure in the urea buffer chamber.

3. Equation for Urea Pressure in the Urea Pump Chamber

In view of the urea pump, for example an equation for urea pressure in the urea pump chamber may be obtained as follows:

$$\dot{P}_p = \frac{\beta}{V_p}(Q_{in} - Q_r + A_p \vartheta) \quad \text{(Equation 3)}$$

wherein:
$\beta_p$: an elastic modulus of urea solution in the urea pump chamber, since the urea pressure in the urea pump chamber is relatively small and usually several atmospheric pressures at most, it may treat $\beta_p$ as a constant, namely, $\beta_p = \beta$
$V_p$: the volume of a urea pump chamber. $V_p = V_{max} - A_p h$, wherein $V_{max}$ is a maximum volume of the urea pump chamber. h is a urea pump plunger stroke, and $A_p$ is an equivalent cross-sectional area of the urea pump plunger.
$Q_r$: a urea pump urea outflow
$Q_{in}$: a urea pump urea inflow
$\theta$: a linear speed of reciprocating movement of the urea pump plunger. $\theta = \omega r \cos(\omega t)$, wherein $\omega$ is a rotation speed of the urea pump drive motor; r is a crank radius of a connecting mechanism of a rotation shaft of the drive motor and the urea pump plunger.

4. Equation of Urea Pressure in the Urea Buffer Chamber

With regard to the urea buffer chamber, for example an equation for urea pressure in the urea buffer chamber may be obtained as follows:

$$\dot{P}_p = \frac{\beta}{V_r}(Q_r - Q_{inj} - Q_s) \quad \text{(Equation 4)}$$

wherein:
$P_r$: a urea pressure in the urea buffer chamber
$\beta$: an elastic modulus of urea solution. Since the urea pressure is usually relatively small, it may be considered as a constant.
$V_r$: the volume of a urea buffer chamber (constant)
$Q_r$: a urea pump urea outflow
$Q_{inj}$: a urea injector urea injection flow
$Q_s$: a urea backflow from the urea buffer chamber to the urea tank.

5. Equation for Urea Injector Urea Injection Flow

For the urea injector, for example an equation for urea injection flow may be obtained as follows:

$$Q_{inj} = C_{inj} A_{inj} \sqrt{\frac{2(P_r - P_h)}{\rho}} \quad \text{(Equation 5)}$$

wherein:
$Q_{inj}$: a urea injector urea injection flow
$C_{inj}$: a urea injector flow coefficient (constant)
$A_{inj}$: an equivalent cross-sectional area (constant) of the urea injector upon opening
$P_r$: urea pressure in the urea buffer chamber
$P_h$: SCR pipe exhaust gas pressure (constant), which is approximately equal to an atmospheric pressure, namely, $P_h = P_0$
$\rho$: urea density (constant).

6. Equation for Urea Buffer Chamber Urea Backflow $$Q_s = C_s A_s \sqrt{\frac{2(P_r - P_0)}{\rho}} \quad \text{(Equation 6)}$$

wherein:
$A_s$: an equivalent cross-sectional area (constant) of a backflow hole of the urea buffer chamber
$C_s$: a flow coefficient (constant) of the backflow hole of the urea buffer chamber
$P_r$: a urea pressure in the urea buffer chamber
$\rho$: a urea density (constant)
$P_0$: atmospheric pressure.

Based on the physical model of the urea injection system as described above, a control model for this system may be designed. Hereinafter reference is made to embodiments to describe control model design based on the physical model of the system. However, it should be noted that these embodiments are presented only for illustration purpose, and the present invention is not limited thereto. On the contrary, under the teaching of the present invention, those skilled in the art may make various modifications and variations thereto.

Design of Control Model

The control model design aims to make an actual measurement value of the urea pressure in the urea buffer chamber approximate to its target value by performing closed loop control of the urea pressure under various operation conditions of the engine. Below is presented an exemplary embodiment of designing a control model based on the physical model of the urea injection system.

First, $P_{r,des}$ is used to represent a urea pressure target value in the urea buffer chamber, and $P_r$ is used to represent an actual measurement value of the urea pressure. Therefore, an error between the actual measurement value $P_r$ and a target value $P_{r,des}$ of the urea pressure may be expressed as:

$$e = P_r - P_{r,des} \tag{Equation 7}$$

Through moving the target value $P_{r,des}$ to the side of the error e, and the following may be obtained:

$$P_r = e + P_{r,des} \tag{Equation 8}$$

By taking time derivative of both sides of the equation 7, and then the following may be obtained:

$$\dot{e} = \dot{P}_r \tag{Equation 9}$$

$$\ddot{e} = \ddot{P}_r \tag{Equation 10}$$

Through taking time derivative of left and right ends of the equation 4, and then the following may be obtained:

$$\ddot{P}_r = \frac{\beta}{V_r}(\dot{Q}_r - \dot{Q}_{inj} - \dot{Q}_s) \tag{Equation 11}$$

It should be noted that $\beta$ here is a constant because the urea pressure is usually relatively small.

The following may be obtained by taking a time derivative for both sides of the foregoing urea pump urea outflow equation (namely, equation 2):

$$\dot{Q}_r == C_r A_r \sqrt{\frac{2}{\rho}} \frac{1}{2} \frac{1}{\sqrt{P_p - P_r}} (\dot{P}_p - \dot{P}_r) = \tag{Equation 12}$$

$$\frac{C_r A_r}{\sqrt{2\rho(P_p - P_r)}}(\dot{P}_p - \dot{P}_r)$$

By taking a time derivative for both sides of the foregoing urea injector urea injection flow equation (namely equation 5), it may obtain the following equation:

$$\dot{Q}_{inj} == C_{inj} A_{inj} \sqrt{\frac{2}{\rho}} \frac{1}{2} \frac{1}{\sqrt{P_r - P_h}} \dot{P}_r = \frac{C_{inj} A_{inj}}{\sqrt{2\rho(P_r - P_h)}} \dot{P}_r \tag{Equation 13}$$

Furthermore, the following equation may be obtained by taking a time derivative of both sides of the foregoing urea buffer chamber urea backflow equation (namely equation 6):

$$\dot{Q}_s == C_s A_s \sqrt{\frac{2}{\rho}} \frac{1}{2} \frac{1}{\sqrt{P_r - P_0}} \dot{P}_r = \frac{C_s A_s}{\sqrt{2\rho(P_r - P_0)}} \dot{P}_r \tag{Equation 14}$$

The following may be obtained by substituting the above-obtained equations 12 to 14 into equation 11:

$$\ddot{P}_r = \frac{\beta}{V_r}\left[\begin{array}{c}\left(\frac{C_r A_r}{\sqrt{2\rho(P_p - P_r)}}\right) \cdot (\dot{P}_p - \dot{P}_r) - \\ \frac{C_{inj} A_{inj}}{\sqrt{2\rho(P_r - P_h)}} \cdot \dot{P}_r - \frac{C_s A_s}{\sqrt{2\rho(P_r - P_0)}} \cdot \dot{P}_r\end{array}\right] \tag{Equation 15}$$

$$= \frac{\beta C_r A_r}{V_r \sqrt{2\rho(P_p - P_r)}} \cdot \dot{P}_p - \frac{\beta}{V_r}\left[\frac{\frac{C_r A_r}{\sqrt{2\rho(P_p - P_r)}} + \frac{C_{inj} A_{inj}}{\sqrt{2\rho(P_r - P_h)}} + }{\frac{C_s A_s}{\sqrt{2\rho(P_r - P_0)}}}\right] \cdot \dot{P}_r$$

If the foregoing equation of urea pressure in the urea pump chamber (namely equation 3) and the equation of urea pressure in the urea buffer chamber (namely equation 4) are substituted respectively into the right side of the equation 15, it may obtain the following equation:

$$\ddot{P}_r = \frac{\beta^2 C_r A_r}{V_r V_p \sqrt{2\rho(P_p - P_r)}} \cdot (Q_{in} - Q_r - A_p \vartheta) - \tag{Equation 16}$$

$$\frac{\beta^2}{V_r^2}\left[\frac{C_r A_r}{\sqrt{2\rho(P_p - P_r)}} + \frac{C_{inj} A_{inj}}{\sqrt{2\rho(P_r - P_h)}} + \frac{C_s A_s}{\sqrt{2\rho(P_r - P_0)}}\right] \cdot$$

$$(Q_r - Q_{inj} - Q_s)$$

$$= \frac{\beta^2 C_r A_r}{V_r V_p \sqrt{2\rho(P_p - P_r)}} \cdot Q_{in} -$$

$$\left[\frac{\beta^2 C_r A_r}{V_r V_p \sqrt{2\rho(P_p - P_r)}} + \frac{\beta^2}{V_r^2}\left(\frac{\frac{C_r A_r}{\sqrt{2\rho(P_p - P_r)}} + \frac{C_{inj} A_{inj}}{\sqrt{2\rho(P_r - P_h)}} + }{\frac{C_s A_s}{\sqrt{2\rho(P_r - P_0)}}}\right)\right] \cdot$$

$$Q_r + \frac{\beta^2}{V_r^2}\left(\frac{C_r A_r}{\sqrt{2\rho(P_p - P_r)}} + \frac{C_{inj} A_{inj}}{\sqrt{2\rho(P_r - P_h)}} + \frac{C_s A_s}{\sqrt{2\rho(P_r - P_0)}}\right) \cdot$$

$$(Q_{inj} + Q_s) + \frac{\beta^2 C_r A_r A_p}{V_r V_p \sqrt{2\rho(P_p - P_r)}} \vartheta$$

Through further arrangement, the equation 16 may be expressed as:

$$\ddot{P}_r = \gamma_1 Q_{in} - \gamma_2 Q_r + \gamma_3 (Q_{inj} + Q_s) + \gamma_4 \vartheta \tag{Equation 17}$$

wherein:

$$\gamma_1 = \frac{\beta^2 C_r A_r}{V_r V_p \sqrt{2\rho(P_p - P_r)}}$$

$$\gamma_2 = \gamma_1 + \frac{\beta^2}{V_r^2}\left(\frac{C_r A_r}{\sqrt{2\rho(P_p - P_r)}} + \right.$$

$$\left. \frac{C_{inj} A_{inj}}{\sqrt{2\rho(P_p - P_h)}} + \frac{C_s A_s}{\sqrt{2\rho(P_r - P_0)}}\right)$$

$$\gamma_3 = \gamma_2 - \gamma_1$$

$$\gamma_4 = A_p \gamma_1$$

As stated above, all of the following parameters are constants: the urea solution elastic modulus $\beta$, the urea pump outlet valve flow coefficient $C_r$, the equivalent cross-sectional area $A_r$ of the urea pump outlet valve, the urea buffer chamber volume $V_r$, the urea density $\rho$, the urea injector flow coefficient $C_{inj}$, the equivalent cross-sectional area $A_{inj}$ of the urea injector, the equivalent cross-sectional area $A_s$ of the urea buffer chamber backflow hole, the flow coefficient $C_s$ of the urea buffer chamber backflow hole and the like. Therefore, it can be seen that coefficients $\gamma_1$, $\gamma_2$, $\gamma_3$ and $\gamma_4$ are polynomials of the urea pressure $P_p$ in the urea pump chamber and the urea pressure $P_r$ in the buffer pump chamber, and they may be determined based on operation condition parameters and constant parameters related to the physical model. Specifically, $\gamma_1$ may be determined by the urea pressure $P_p$ in the urea pump chamber, the urea pressure $P_r$ in the buffer pump chamber, the urea pump plunger stroke h (for determining $V_p$) and constant parameters related to the physical model, wherein the constants include the urea solution elasticity modulus $\beta$, the urea pump outlet valve flow coefficient $C_r$, the equivalent cross-sectional area $A_r$ of the urea pump outlet valve, the urea buffer chamber volume $V_r$, the urea density $\rho$ and the like. Similarly, $\gamma_2$ may be determined by the urea pressure $P_p$ in the urea pump chamber, the urea pressure $P_r$ in the buffer pump chamber, the urea pump plunger stroke h (for determining $V_p$) and constant parameters related to the physical model, wherein these constants include the urea solution elasticity modulus $\beta$, the urea pump outlet valve flow coefficient $C_r$, the equivalent cross-sectional area $A_r$ of the urea pump outlet valve, the urea buffer chamber volume $V_r$, the urea density $\rho$, the urea injector flow coefficient $C_{inj}$, the equivalent cross-sectional area $A_{inj}$ of the urea injector, the equivalent cross-sectional area $A_s$ of the urea buffer chamber backflow hole, the flow coefficient $C_s$ of the urea buffer chamber backflow hole and the like. Likewise, $\gamma_3$ may be determined by the urea pressure $P_p$ in the urea pump chamber, the urea pressure $P_r$ in the buffer pump chamber and constant parameters related to the physical model wherein these constants include the urea solution elasticity modulus $\beta$, the urea pump outlet valve flow coefficient $C_r$, the equivalent cross-sectional area $A_r$ of the urea pump outlet valve, the urea buffer chamber volume $V_r$, the urea density $\rho$, the urea injector flow coefficient $C_{inj}$, the equivalent cross-sectional area $A_{inj}$ of the urea injector, the equivalent cross-sectional area $A_s$ of the urea buffer chamber backflow hole, the flow coefficient $C_s$ of the urea buffer chamber backflow hole and the like. Likewise, $\gamma_4$ may be determined by the urea pressure $P_p$ in the urea pump chamber, the urea pressure $P_r$ in the buffer pump chamber, the urea pump plunger stroke h (for determining $V_p$) and constant parameters related to the physical model, wherein these constants include the urea solution elasticity modulus $\beta$, the urea pump outlet valve flow coefficient $C_r$, the equivalent cross-sectional area $A_r$ of the urea pump outlet valve, the urea buffer chamber volume $V_r$, the urea density $\rho$ and the equivalent cross-sectional area $A_p$ of the urea pump plunger.

Based on above equations 10 and 17 and let $\ddot{e}|k_d\dot{e}|k_pe|k_i\int e=0$, the following control model may be designed:

$$\vartheta = -\frac{1}{\gamma_4}[\gamma_1 Q_{in} - \gamma_2 Q_r + \gamma_3(Q_{inj} + Q_s)] - \quad \text{(Equation 18)}$$

$$\frac{1}{\gamma_4}\left(k_p e + k_i \int e + k_d \dot{e}\right)$$

Considering an average speed $\theta_{avg}\omega r/\sqrt{2\pi}$, the following may be obtained:

$$\omega = -\frac{\sqrt{2}}{r\gamma_4}[\gamma_1 Q_{in} - \gamma_2 Q_r + \gamma_3(Q_{inj} + Q_s)] - \quad \text{(Equation 19)}$$

$$\frac{\sqrt{2}}{r\gamma_4}\left(k_p e + k_i \int e + k_d \dot{e}\right)$$

In fact, the control module includes two portions, one of which is a feedforward control term:

$$\omega_{FF} = -\frac{\sqrt{2}}{r\gamma_4}[\gamma_1 Q_{in} - \gamma_2 Q_r + \gamma_3(Q_{inj} + Q_s)] \quad \text{(Equation 20)}$$

wherein $\gamma_1$, $\gamma_2$, $\gamma_3$ and $\gamma_4$ are control coefficients and determined based on the acquired operation condition parameters and constant parameters related to the physical model; r is a crank radius of a connecting mechanism between the drive motor and the urea pump plunger; $Q_{in}$ is the urea pump urea inflow; $Q_r$ is urea pump urea outflow; $Q_{inj}$ is urea injector urea injection flow; and $Q_s$ is urea buffer chamber urea backflow.

The other portion of the control module is feedback control term:

$$\omega_{BF} = \frac{\sqrt{2}}{r\gamma_4}\left(k_p e + k_i \int e + k_d \dot{e}\right) \quad \text{(Equation 21)}$$

wherein $\gamma_4$ is a control coefficient and similarly may be determined based on the acquired operation condition parameters and constant parameters related to the physical model; r is a crank radius of a connecting mechanism between the drive motor and the urea pump plunger; and $k_p$, $k_I$ and $k_d$ are control coefficients respectively for proportional control, integral control and derivative control. Regarding the feedback control item, appropriate $k_p$, $k_I$ and $k_d$ gains may be selected to ensure the urea injection system stable. In other words, a characteristic root of the following equation is ensured in a left half plane of s plane:

$$\ddot{e}+k_d\dot{e}+k_pe+k_i\int e=0 \quad \text{(Equation 22)}$$

That is, it is ensured that when t→0, e→0. In this way, appropriate $k_p$, $k_I$ and $k_d$ gains may be obtained.

However, as those skilled in the art know, the control model may only include the feedforward control item, feedback control item, or a combination thereof. Furthermore, the feedback control is not limited to the PID control, and PI control is also feasible in actual application. Hence, the present invention is not limited to exemplary embodiments presented here.

Therefore, in one embodiment according to the present invention, operation parameters to be measured may include the urea pump plunger stroke h, the urea pressure $P_p$ in the urea pump chamber, the urea pressure $P_r$ in the urea buffer chamber, the urea pump chamber urea inflow $Q_{in}$, urea pump chamber urea outflow $Q_r$, urea injector urea injection flow $Q_{inj}$, and urea buffer chamber urea backflow $Q_s$. These parameters are those required for determining a control quantity based on the control model. However, the present invention is not limited to this, and instead, more parameters or other alternative parameters may be determined to calculate or determine these operation condition parameters from these parameters. For example, regarding the urea pump plunger stroke h, it is a function of a camshaft angle θ, so the camshaft angle θ may be obtained, and then the urea pump plunger stroke may be calculated based on a physical relation between the camshaft angle and the urea pump plunger stroke.

It should be appreciated that the control module presented above is only an exemplary embodiment. Diverse variations to the control model are possible. For instance, under some operation conditions, in the physical model, it is feasible not to consider one or more parameters or aspects in equations described above, and/or feasible to add new parameters or aspects related to the urea injection system of the engine. In fact, based on the above suggestions and teaching presented by the present invention, those skilled in the art may design and implement any suitable control model in combination with other specific requirements and conditions.

Besides, the control model is preferably determined in advance based on the physical model. As such, a value of the control quantity may be directly determined based on various operation parameters and system object value during operation of the engine, so that a response speed of the system may be increased and the control efficiency be improved.

Among the above-mentioned operation parameters, partial parameters, e.g., the urea pressure $P_r$ in the urea buffer chamber, may be directly measured by a measuring device such as a sensor according to the prior art. Besides, some operation condition parameters, such as the urea pump plunger stroke h(θ), may be obtained by calculating from other measured parameters (e.g., camshaft angle) based on physical relations therebetween. Besides, some further parameters cannot be obtained or are difficult to obtain through measurement by means of the existing technology, or may be achieved at a high cost. Regarding such parameters, they may be obtained by estimating from states of other relevant parameters, or obtained in other empirical manners. One example of such parameters is the urea pressure $P_p$ in the urea pump chamber.

In a preferred embodiment according to the present invention, there is also included an observation value determining module 204 configured to determine an observation value of a parameter such as the urea pressure in the urea pump chamber. As shown in FIG. 2, the observation value determining module 204 is coupled to the operation condition parameter acquiring module 201 and the control quantity determining module 202, and configured to determine, based on the operation condition parameters as well as an observer model designed based on the physical model, the observation value of the urea pressure Pp in the urea pump chamber, for using by the control quantity determining module in determining the control quantity. In the following text, an example of designing a state observer model will be presented for a purpose of illustration. However, it may be noted that those skilled in the art may appreciate that the observer may be designed by various means.

State Observer Model for Urea Pressure

In order to determine an observer value of the urea pressure $P_p$ in the urea pump chamber, the observer will be designed by means of the equation 3 for the urea pressure in the urea pump chamber and the equation 4 of the urea pressure in the urea buffer chamber.

First, is may be assumed that a state observation value of the urea pressure $P_p$ in the urea pump chamber be $\hat{P}_p$, and a measurement value of the urea pressure $P_r$ in the urea buffer chamber be $\overline{P}_r$, a state observation value of the urea pressure in the urea buffer chamber be $\hat{P}_r$.

The following two equations may be obtained based on the equations 3 and 4, by designing the observer through adding an adjustment item respectively to the equation for the urea pressure in the urea pump chamber and the equation of the urea pressure in the urea buffer chamber, and through substituting the equation 2, equation 5 and equation 6 into the equations 3 and 4:

$$\hat{P}_p = \frac{\beta}{V_p}\left(Q_{in} - C_r A_r \sqrt{\frac{2(\hat{P}_p - \hat{P}_r)}{\rho}} + A_p \dot{\theta}\right) + \mathcal{L}_p(\hat{P}_r - \overline{P}_r) \quad \text{(Equation 23)}$$

$$\hat{P}_r = \frac{\beta}{V_p}\left(C_r A_r \sqrt{\frac{2(\hat{P}_p - \hat{P}_r)}{\rho}} - C_{inj} A_{inj} \sqrt{\frac{2(\hat{P}_r - P_h)}{\rho}} - C_s A_s \sqrt{\frac{2(\hat{P}_r - P_0)}{\rho}}\right) + \mathcal{L}(\hat{P}_r - \overline{P}_r) \quad \text{(Equation 24)}$$

Adjusting factors Lp and Lr related to the adjustment items in the equations 23 and 24 may be selected as appropriate values enabling both of the two equations 23 and 24 stable and converged. This may be determined according to requirements in actual application.

Therefore, there is a solution to an equation simultaneously formed by equations 23 and 24. Hence, this means that the value of $\hat{P}_p$ may be obtained or preferably values of both of $\hat{P}_p$ and $\hat{P}_r$ may be preferably obtained, based on measurements of operation condition parameters (including for example the urea pump chamber volume $V_p$ (or the urea pump plunger stroke h), the urea pump urea inflow $Q_{in}$, a urea pump plunger movement linear speed $\dot{\theta}$ (or a rotation speed ω of the urea pump drive motor)) and the urea pressure $P_r$ in the urea buffer chamber.

Therefore, in the preferred embodiment, the observation value determining module 204 may determine, based on the physical model and the operation conditions parameters, the observation value $\hat{P}_p$ of the urea pressure in the urea pump chamber to determine the control quantity to be described hereinafter. Preferably, the observation value $\hat{P}_r$ of the urea pressure in the urea buffer chamber may be further determined to determine the control quantity to be described hereunder.

In fact, a measurement of the urea pressure in the urea buffer chamber may also be used upon determining the control quantity. However, it is preferable to use the observation value $\hat{P}_r$ of the urea pressure in the urea buffer chamber. This is because the observation value $\hat{P}_r$ is in fact equivalent to a filtered value of the measurement $P_r$ and therefore use of the observation value can improve accuracy of the control model.

Figure 3:
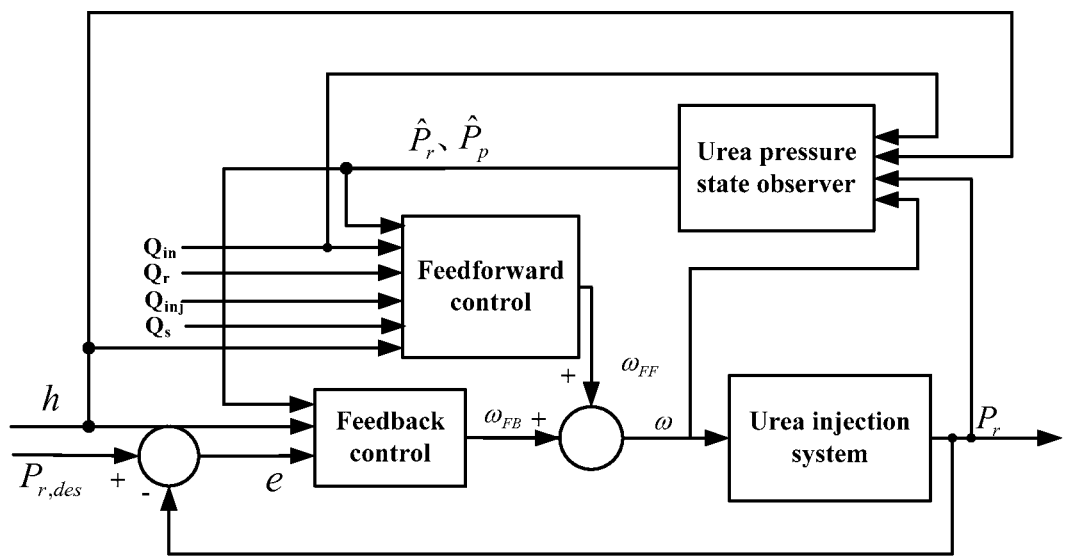
FIG. 3 schematically illustrates a block diagram of a closed loop feedback control of the urea injection system of the diesel engine according to the present invention.

For the sake of illustration, FIG. 3 schematically illustrates a block diagram of a nonlinear closed loop feedback control model of the urea injection system of the diesel engine according to a preferred embodiment of the present invention. As shown in FIG. 3, the urea injection system is equipped with an observer and a controller, wherein the controller comprises a feedforward control portion and a feedback control (e.g., PID) portion. An error between the urea pressure in the urea pump chamber as actually measured and a target urea pressure value is provided to the above-mentioned feedback control portion. A feedback control component $\omega_{FB}$ is provided by the feedback control portion based on the acquired operation condition parameters, such as the urea pump plunger stroke h, pressure observation values $\hat{P}_p$ and $\hat{P}_r$ observed by the observer and the error of urea pressure in the urea buffer chamber. On the other hand, the urea pressure state observer observes the observation values $\hat{P}_p$ and $\hat{P}_r$ of the urea pressure in the plunger pump chamber and the urea pressure in the urea buffer chamber based on the control quantity ω, an actual urea pressure measurement Pr and the acquired operation condition parameters (including for example the urea pump plunger stroke h and the urea pump chamber urea inflow $Q_{in}$). The feedforward portion provides a feedforward control component $ω_{FF}$ based on the two observation values as observed and the measured operation condition parameters (namely, the urea pump plunger stroke h and the urea pump chamber urea inflow $Q_{in}$, the urea pump chamber urea outflow $Q_r$, the urea injector urea injection flow $Q_{inj}$, and the urea buffer chamber urea backflow $Q_s$). The two components $ω_{FB}$ and $ω_{FF}$ jointly constitute the control quantity ω, namely, the rotation speed of the urea pump drive motor.

As can be seen from the above, operation condition parameters for implementing the control need may comprise: the urea pump plunger stroke h, the urea pressure $P_p$ in the plunger pump chamber, the urea pressure $P_r$ in the urea buffer chamber, the urea pump urea inflow $Q_{in}$, the urea pump urea outflow $Q_r$, the urea injector urea injection flow $Q_{inj}$, and the urea buffer chamber urea backflow $Q_s$. The plunger movement linear speed θ in the urea pump chamber used upon observing Pr and Pp may be a value determined from the current control quantity ω in accordance with relationship between it and θ.

Therefore, as stated above, the observation value determining module 204 may determine the observation values $\hat{P}_p$ and $\hat{P}_r$ of the urea pressure in the urea pump chamber and the urea pressure in the urea buffer chamber based on the operation condition parameters measured or calculated by the operation condition parameter acquiring module 201, and in accordance with for example the aforesaid designed observer model. Then, the control quantity determining module 202 may determine the control quantity ω by using these operation condition parameters (including the urea pressure values $\hat{P}_p$ and $\hat{P}_r$ obtained through observation of the observer), the control model determined based on the physical model and the target value of the urea pressure in the urea pump chamber. The drive signal generating module 203 may further generate a drive signal for driving the urea pump drive motor based on a magnitude of the control quantity.

According to an embodiment, particularly a preferred embodiment of the present invention, the control device as provided performs the control based on the physical model of the urea injection system of the diesel engine. Since the physical model of the urea injection system of the diesel engine is adapted for an operation procedure of the system under any operation conditions, the technical solution of the present invention based on the physical model may achieve an accurate injection pressure and a fast system response, thereby reducing a deviation between the actual pressure of injected urea and a target pressure and in the preferred embodiment, it may be minimized. The control model designed based on the physical model of the urea injection system may be quantified, and thereby it may substantially reduce the calibrated workload for the control model and improves efficiency and functionality of the urea injection system of the engine.

In addition, the present invention further provides a method for controlling the urea injection system of the diesel engine. Next, the method will be described in detail with reference to FIG. 4 which schematically illustrates a flow chart of a method for controlling a urea injection system of a diesel engine according to an embodiment of the present invention.

Figure 4:
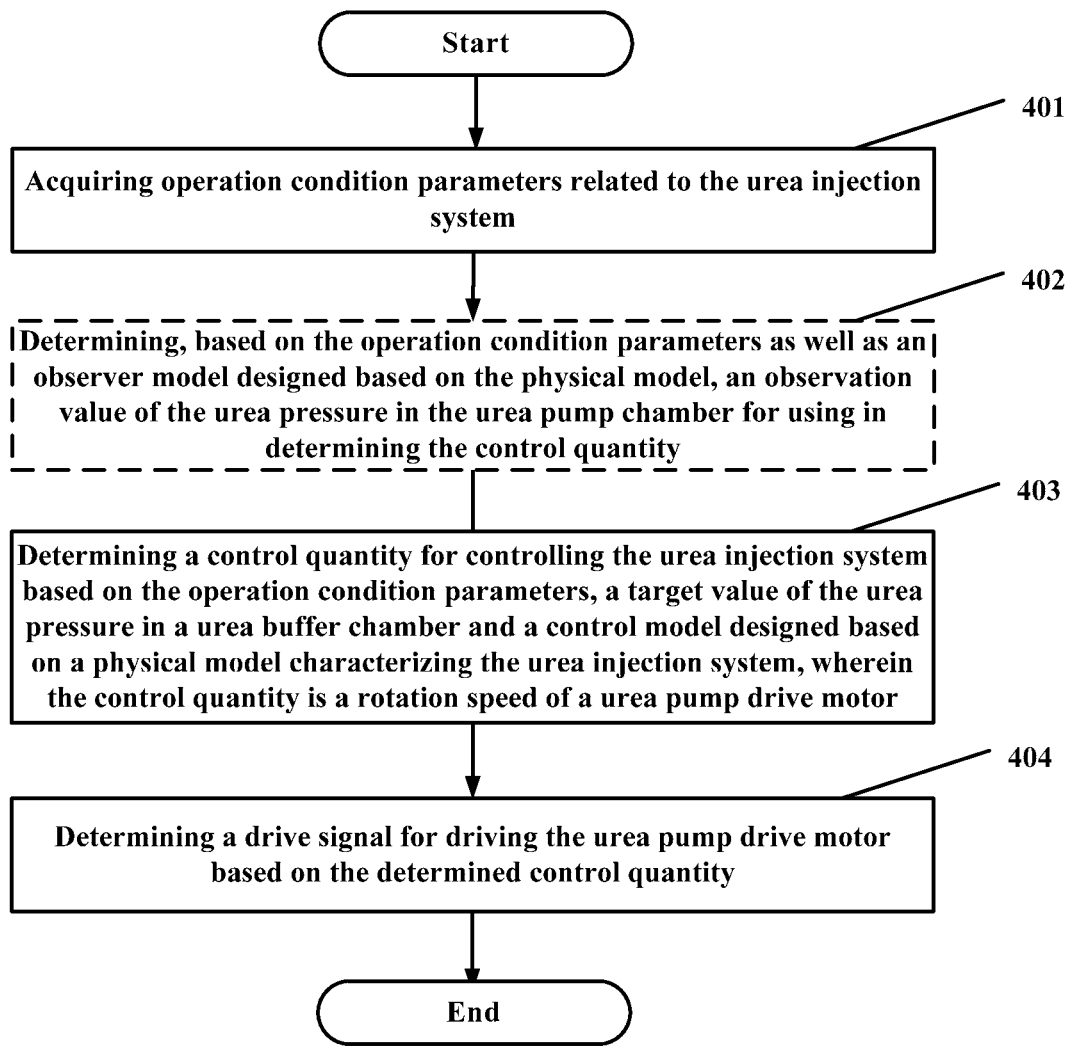
FIG. 4 schematically illustrates a flow chart of a method for controlling a urea injection system of a diesel engine according to an embodiment of the present invention.

As shown in FIG. 4, first at step 401, operation parameters related to the urea injection system may be obtained. As stated above, the operation parameters may comprise: the urea pump plunger stroke, the urea pressure in the urea pump chamber, the urea pressure in the urea buffer chamber, the urea pump urea inflow, urea pump urea outflow, urea injector urea injection flow, and urea buffer chamber urea backflow.

In a preferred embodiment, as stated above, at step 402, the observation value of the urea pressure in the urea pump chamber may be determined based on the operation condition parameters as well as an observer model designed based on the physical model, to determine the control quantity described hereinabove. In one embodiment of the present invention, the observer model is designed by adding an adjustment item respectively to the equation for the urea pressure in the urea pump chamber and the equation for the urea pressure in the urea buffer chamber in the physical model, and selecting adjusting factors enabling both of the two adjusted equations stable and converged. More preferably, based on the operation condition parameters as well as the observer model, the observation value of the urea pressure in the urea buffer chamber may be determined, for using in determining the control quantity.

Then, at step 403, the control quantity for controlling the urea injection system may be determined based on the operation condition parameters, the target value of the urea pressure in the urea buffer chamber and the control model designed based on the physical model characterizing the urea injection system, wherein the control quantity is a rotation speed of the urea pump drive motor.

In an embodiment according to the present invention, the physical model of the urea injection system may be characterized by: an expression for the urea pump urea inflow; an expression for a urea pump urea outflow; an expression for urea pressure in the urea pump chamber; an expression for urea pressure in the urea buffer chamber; an expression for the urea injector urea injection flow; and an expression for the urea buffer chamber urea backflow.

Additionally, the control model designed based on the physical model may comprise a feedforward controller, and the control quantity comprises a feedforward control component. In one embodiment of the present invention, the feedforward control component $ω_{FF}$ may be expressed as:

$$ω_{FF} = -\frac{\sqrt{2}}{rγ_4}[γ_1 Q_{in} - γ_2 Q_r + γ_3(Q_{inj} + Q_s)]$$

wherein $γ_1$, $γ_2$, $γ_3$ and $γ_4$ are control coefficients and determined based on the acquired operation condition parameters and constant parameters related to the physical model; r is a crank radius of a connecting mechanism between the drive motor and the urea pump plunger; $Q_{in}$ is the urea pump urea inflow; $Q_r$ is urea pump urea outflow; $Q_{inj}$ is urea injector urea injection flow; and $Q_s$ is urea buffer chamber urea backflow.

Additionally or alternatively, the control model comprises a feedback controller, e.g., a PID feedback controller, and the control quantity comprises a feedback control component. In one embodiment according to the present invention, the feedback control component $ω_{FB}$ may be expressed as:

$$\omega_{BF} = \frac{\sqrt{2}}{r\gamma_4}\left(k_p e + k_i \int e + k_d \dot{e}\right)$$

wherein e is an error between an actual value of the urea pressure in the urea buffer chamber and its target value; $\gamma_4$ is a control coefficient and determined based on the acquired operation condition parameters and constant parameters related to the physical model; r is a crank radius of a connecting mechanism between the drive motor and the urea pump plunger; $k_p$, $k_i$ and $k_d$ are control coefficients respectively for proportional control, integral control and derivative control, and $k_p$, $k_i$ and $k_d$ are selected to make the urea injection system stable.

Thereafter, at step 404, the drive signal for driving the urea pump drive motor may be determined according to the determined control quantity.

Operations of various steps in this method substantially correspond to the operations of various components of the control device as depicted above. Therefore, for more about specific operations of steps in the method or details about the content therein, please refer to the foregoing depictions of the control device with reference to FIG. 2 and FIG. 3.

Besides, it should be noted that the embodiments of the present invention can be implemented in hardware, software or the combination thereof. The hardware part can be implemented by a special logic; the software part can be stored in a memory and executed by a proper instruction execution system such as a microprocessor or a design-specific hardware. The normally skilled in the art may understand that the above method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their components in the present invention may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

It should be noted that although a plurality of devices or sub-device of the control apparatus have been mentioned in the above detailed depiction, such partitioning is merely non-compulsory. In actuality, according to the embodiments of the present invention, the features and functions of the above described two or more means may be embodied in one means. In turn, the features and functions of the above described one means may be further embodied in more modules.

Besides, although operations of the present methods are described in a particular order in the drawings, it does not require or imply that these operations must be performed according to this particular sequence, or a desired outcome can only be achieved by performing all shown operations. Instead, the execution order for the steps as depicted in the flowcharts may be varied. Additionally or alternatively, some steps may be omitted, a plurality of steps may be merged into one step, or a step may be divided into a plurality of steps for execution.

Although the present invention has been depicted with reference to the currently considered embodiments, it should be understood that the present invention is not limited the disclosed embodiments. On the contrary, the present invention intends to cover various modifications and equivalent arrangements included in the spirit and scope of the appended claims. The scope of the appended claims accords with the broadest explanations and covers all such modifications and equivalent structures and functions.

What is claimed is:

1. An apparatus for controlling a urea injection system of a diesel engine, comprising:
    an operation condition parameter acquiring module configured to acquire operation condition parameters related to a mechanical, hydraulic component of the urea injection system;
    an observation value determining module coupled to the operation condition parameter acquiring module and configured to determine an observation value of a urea pressure in a urea pump chamber based on the operation condition parameters and also based on an observer model which comprises a physical expression for the urea pressure in the urea pump chamber with a first adjustment item and a physical expression for the urea pressure in a urea buffer chamber with a second adjustment item, wherein the first adjustment item is formed by a first adjusting factor and by a difference between an observation value and a measured value of the urea pressure in the urea buffer chamber and wherein the second adjustment item is formed by a second adjusting factor and by the difference and wherein the first and second adjusting factors are two values selected so that both of the two adjusted expressions are stable and converged;
    a control quantity determining module coupled to the operation condition parameter acquiring module and configured to determine a rotation speed of a urea pump drive motor based on the operation condition parameters, the observation value of the urea pressure in the urea pump chamber, a target value of the urea pressure in the urea buffer chamber and a closed loop control model designed based on a physical model characterizing physical relationships among main mechanical, hydraulic components of the urea injection system;
    a drive signal determining module coupled to the control quantity determining module and configured to determine a drive signal for driving the urea pump drive motor based on the determined rotation speed of the urea pump drive motor; and wherein the urea pump drive motor is driven based on the determined drive signal.

2. The apparatus according to claim 1, wherein the observation value determining module is further configured to:
    determine, based on the operation condition parameters as well as the observer model, an observation value of the urea pressure in the urea buffer chamber, for using by the control quantity determining module in determining the control quantity.

3. The apparatus according to claim 1, wherein the operation condition parameters comprise: a urea pump plunger stroke, a urea pressure in the urea pump chamber, a urea pressure in the urea buffer chamber, a urea pump urea inflow, a urea pump urea outflow, a urea injector urea injection flow, and a urea buffer chamber urea backflow.

4. The apparatus according to claim 1, wherein the physical model is characterized by:
    an expression for urea pump urea inflow;
    an expression for urea pump urea outflow;

an expression for of urea pressure in the urea pump chamber;
an expression for urea pressure in the urea buffer chamber;
an expression for the urea buffer chamber urea backflow; and
an expression for the urea injector urea injection flow.

5. The apparatus according to claim 1, wherein the control model comprises a feedforward controller, and wherein the control quantity comprises a feedforward control component.

6. The apparatus according to claim 5, wherein the feedforward control component $\omega_{FF}$ is expressed as:

$$\omega_{FF} = -\frac{\sqrt{2}}{r\gamma_4}[\gamma_1 Q_{in} - \gamma_2 Q_r + \gamma_3(Q_{inj} + Q_s)]$$

wherein $\gamma_1$, $\gamma_2$, $\gamma_3$ and $\gamma_4$ are control coefficients and determined based on the acquired operation condition parameters and constant parameters related to the physical model; r is a crank radius of a connecting mechanism between the drive motor and the urea pump plunger; $Q_{in}$ is the urea pump urea inflow; $Q_r$ is urea pump urea outflow; $Q_{inj}$ is urea injector urea injection flow; and Qs is urea buffer chamber urea backflow.

7. The apparatus according to claim 5, wherein the control model comprises a feedback controller, and wherein the control quantity comprises a feedback control component.

8. The apparatus according to claim 7, wherein the feedback control component is expressed as:

$$\omega_{BF} = \frac{\sqrt{2}}{r\gamma_4}\left(k_p e + k_i \int e + k_d \dot{e}\right)$$

wherein e is an error between an actual value of the urea pressure in the urea buffer chamber and its target value; $\gamma_4$ is a control coefficient and determined based on the acquired operation condition parameters and constant parameters related to the physical model; r is a crank radius of a connecting mechanism between the drive motor and the urea pump plunger; $k_p$, $k_i$, and $k_d$ are control coefficients respectively for proportional control, integral control and derivative control, and $k_p$, $k_i$, and $k_d$ are selected to make the urea injection system stable.

9. A method for controlling a urea injection system of a diesel engine, comprising:
acquiring operation condition parameters related to a mechanical, hydraulic component of the urea injection system;
determining an observation value of the urea pressure in a urea pump chamber based on the operation condition parameters as well as an observer model which comprises a physical expression for a urea pressure in the urea pump chamber with a first adjustment item and a physical expression for the urea pressure in a urea buffer chamber with a second adjustment item, wherein the first adjustment item is formed by a first adjusting factor and a difference between an observation value and a measured value of the urea pressure in a urea buffer chamber and wherein the second adjustment item is formed by a second adjusting factor and by the difference and wherein the first and second adjusting factors are two values selected so that both of the two adjusted expressions are stable and converged;
determining a rotation speed of a urea pump drive motor based on the operation condition parameters, the observation value of the urea pressure in the urea pump chamber, a target value of the urea pressure in the urea buffer chamber and a closed-loop control model designed based on a physical model characterizing physical relationships among main mechanical, hydraulic components of the urea injection system;
determining a drive signal for driving the urea pump drive motor based on the determined rotation speed of the urea pump drive motor; and
driving the urea pump drive motor based on the drive signal.

10. The method according to claim 9, further comprising:
determining, based on the operation condition parameters as well as the observer model, an observation value of the urea pressure in the urea buffer chamber to determine the control quantity.

11. The method according to claim 9, wherein the operation condition parameters comprise: a urea pump plunger stroke, a urea pressure in the urea pump chamber, a urea pressure in the urea buffer chamber, a urea pump urea inflow, a urea pump urea outflow, a urea injector urea injection flow, and a urea buffer chamber urea backflow.

12. The method according to claim 9, wherein the physical model is characterized by:
an expression for a urea pump urea inflow;
an expression for a urea pump urea outflow;
an expression for urea pressure in the urea pump chamber;
an expression for urea pressure in the urea buffer chamber;
an expression for the urea buffer chamber urea backflow; and
an expression for the urea injector urea injection flow.

13. The method according to claim 9, wherein the control model comprises a feedforward controller, and the control quantity comprises a feedforward control component.

14. The method according to claim 13, wherein the feedforward control component $\omega_{FF}$ is expressed as:

$$\omega_{FF} = -\frac{\sqrt{2}}{r\gamma_4}[\gamma_1 Q_{in} - \gamma_2 Q_r + \gamma_3(Q_{inj} + Q_s)]$$

wherein $\gamma_1$, $\gamma_2$, $\gamma_3$ and $\gamma_4$ are control coefficients and determined based on the acquired operation condition parameters and constant parameters related to the physical model; r is a crank radius of a connecting mechanism between the drive motor and the urea pump plunger; $Q_{in}$ is the urea pump urea inflow; $Q_r$ is urea pump urea outflow; $Q_{inj}$ is urea injector urea injection flow; and $Q_s$ is urea buffer chamber urea backflow.

15. The method according to claim 13, wherein the control model comprises a feedback controller, and wherein the control quantity comprises a feedback control component.

16. The method according to claim 15, wherein the feedback control component co is expressed as:

$$\omega_{BF} = \frac{\sqrt{2}}{r\gamma_4}\left(k_p e + k_i \int e + k_d \dot{e}\right)$$

wherein e is an error between an actual value of the urea pressure in the urea buffer chamber and its target value; $\gamma_4$ is a control coefficient and determined based on the acquired operation condition parameters and constant parameters related to the physical model; r is a crank radius of a connecting mechanism between the drive motor and the urea pump plunger; $k_p$, $k_i$, and $k_d$ are control coefficients respectively for proportional control, integral control and derivative control, and $k_p$, $k_i$, and $k_d$ are selected to make the urea injection system stable.

\* \* \* \* \*